United States Patent [19]

Hughes-Hartogs

[11] Patent Number: 5,296,693

[45] Date of Patent: Mar. 22, 1994

[54] INK INTRUSION RESISTANT DIGITAL CODE

[75] Inventor: Dirk Hughes-Hartogs, Morgan Hill, Calif.

[73] Assignee: Canon Kabushiki Kaisha, Palo Alto, Calif.

[21] Appl. No.: 807,227

[22] Filed: Dec. 16, 1991

[51] Int. Cl.$^5$ ............................................. G06K 19/06
[52] U.S. Cl. ..................................... 235/494; 235/454
[58] Field of Search ...................... 235/494, 454, 462

[56] References Cited

U.S. PATENT DOCUMENTS

| | | | |
|---|---|---|---|
| 3,453,419 | 7/1969 | Torrey | 235/494 |
| 3,673,389 | 6/1972 | Kapsambelis | 235/436 |
| 4,114,033 | 9/1978 | Okamoto | 235/494 |
| 4,286,146 | 8/1981 | Uno et al. | 235/456 |
| 4,337,375 | 6/1982 | Freeman | 235/472 |
| 4,488,679 | 12/1984 | Bockholt et al. | 235/469 |
| 4,896,029 | 1/1990 | Chandler et al. | 235/494 |
| 5,008,950 | 4/1991 | Katayama et al. | 358/447 |

FOREIGN PATENT DOCUMENTS

| | | | |
|---|---|---|---|
| 0229383 | 7/1988 | European Pat. Off. | |
| 10396 | 1/1989 | Japan | 235/494 |
| 295387 | 11/1989 | Japan | 235/494 |
| 2218240A | 5/1988 | United Kingdom | |

OTHER PUBLICATIONS

J. D. Hall et al, IBM Technical Disclosure Bulletin vol. 24, No. 2, Jul. 1981, p. 1259.

Primary Examiner—John Shepperd
Attorney, Agent, or Firm—Paul Hentzel

[57] ABSTRACT

A two dimensional row and column based system for storing digital data is formatted on a suitable base medium such as paper sheet 10. The data format is formed by a plurality of data units 10U having L data entry locations 14. The data is contained in the selective presence or absence of recording ink within the locations. Each data unit extends R locations along the row axis and C locations along the column axis.

Any E entry locations of the L locations within the data unit are designated recording material present locations. The L−E remainder locations are designated recording material absent locations.

The number of codes C that may be represented by these E in L type data units is determined by the relationship:

$$C = (L!) / (L-E)!(E!).$$

The number of entries E is the same for each data unit throughout the data storage area, and cannot be less than E. Codes having the greatest number of presence absence interfaces are discarded to reduce the effect of recording ink intrusions into adjacent units. In decoding the code the locations with the highest greyscale are selected as recording material present locations.

14 Claims, 5 Drawing Sheets

INK INTRUSION RESISTANT DIGITAL CODE

TECHNICAL FIELD

This invention relates to data formats, and more particularly to such formats for recording digital data on a paper medium.

BACKGROUND

Digital data has been recorded as punched holes in a paper medium in the form of paper tape and IBM cards. The hole entries were necessarily large resulting in a very low density data format. Digital data has also been recorded on paper medium by the conventional printing of ink pigments. The pigment entries were typically black and somewhat smaller then the punched holes, producing a somewhat higher density format.

Laser beam printing on paper offers a higher density format. Current printer have an ink dot density of 300 dot per inch (dpi) with a dot diameter of about 3 mils. However peripheral dispersion of the particles of toner dust limits the closeness of adjacent entries in the data format. High density dots with toner dispersion may introduce read errors when the digital data is retrieved. In addition, the toner dots may be out of registration or irregular in shape further limiting the recording density.

SUMMARY

It is therefore an object of this invention to provide a an improved data format system for recording digital data.

It is another object of this invention to provide such a data format with a higher data density.

It is a further object of this invention to provide such a data format which is more reliable.

It is a further object of this invention to provide such a data format system which is non-parametric.

It is a further object of this invention to provide such a data format which minimizes ink intrusion errors.

It is a further object of this invention to provide such a data format in which the error prone codes are discarded.

It is a further object of this invention to provide such a data format which the represents eye readable text and which is printed on the same document as the text.

Briefly, these and other objects of the present invention are accomplished by providing a two dimensional row and column based system for storing digital data. The base medium for the system has at least one digital data storage area formatted along a row axis and a column axis. Recording material is deposited on the base medium for recording the digital data by the selective presence and absence of the recording material within the storage area. The storage area includes a plurality of two dimensional data units having L data locations, R locations extending along the row axis and C locations extending along the column axis. Only E locations are designated as recording material present locations. The remaining L−E locations are designated recording material absent locations. The number of possible codes C represented by the data units is determined by the relationship $$C = (L!) / (L-E)!(E!).$$

BRIEF DESCRIPTION OF THE DRAWING

Further objects and advantages of the present data storage system will become apparent from the following detailed description and drawing (not drawn to scale) in which.

Figure 1:
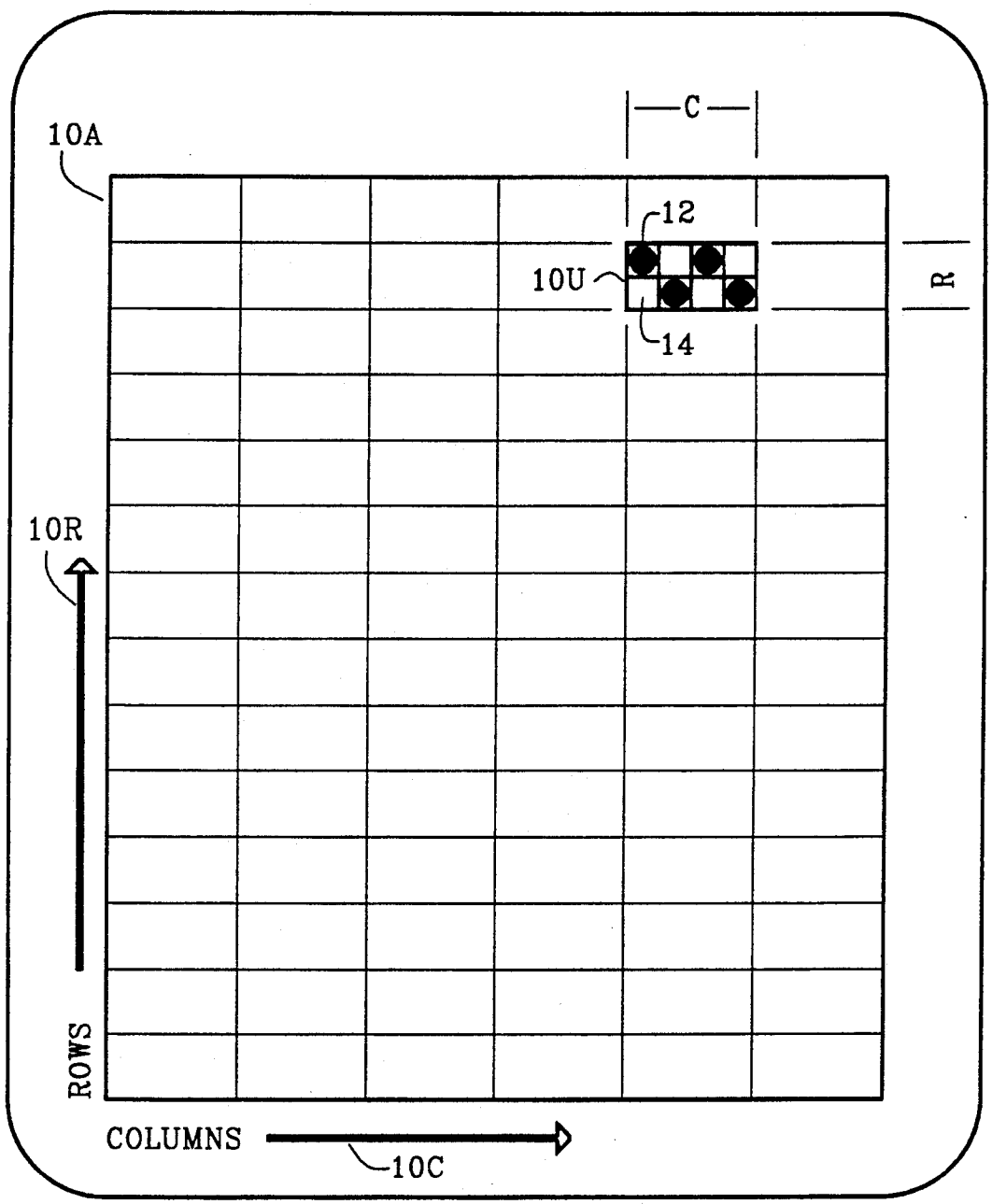
FIG. 1 is a diagram of a base medium containing a plurality of data units.

The first digit of each reference numeral in the above Figures indicates the Figure in which that element is shown. The second digit indicates like structural elements, and the final letter indicates a sub-portion of an element.

GENERAL DESCRIPTION (FIG. 1)

A two dimensional row and column based system for storing digital data is formatted on a suitable base medium such as paper sheet 10. The data format on the sheet includes at least one digital data storage area 10A formatted along row axis 10R and a column axis 10C. A suitable deposited recording material such as ink entries 12 is carried by the sheet for recording the digital data. The data format is formed by a plurality of data units 10U having L data entry locations 14. The data is contained in the selective presence or absence of the recording ink within the locations. Each data unit extends R locations along the row axis and C locations along the column axis.

Any E entry locations of the L locations within the data unit are designated recording material present locations. The L−E remainder locations are designated recording material absent locations.

The number of possible codes C that may be represented by these E in L type data units is determined by the relationship:

$$C = (L!) / (L-E)!(E!)$$

where

C is the total number of possible codes represented by the data format,
L is the number of data locations within a single data unit, and
E is the number of locations within each data unit which actually contain entries.

The number of entries E is the same for each data unit throughout the data storage area, and cannot be less than E.

Figure 2A:
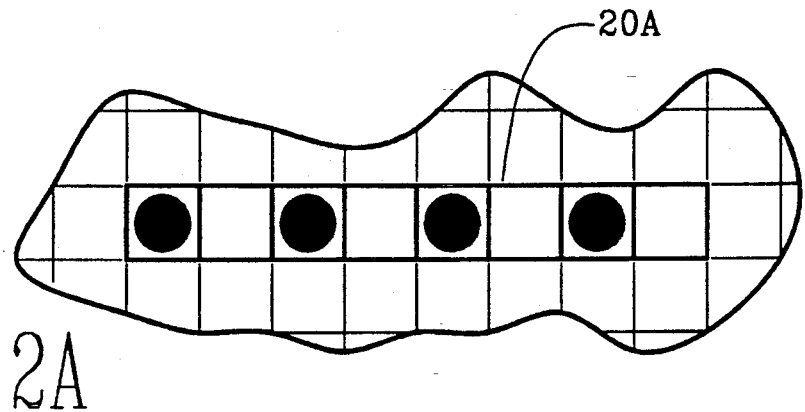
FIG. 2A is a fragmentary view of a 4 entries in 8 locations embodiment arranged in a single row 8 columns wide.
Figure 2B:
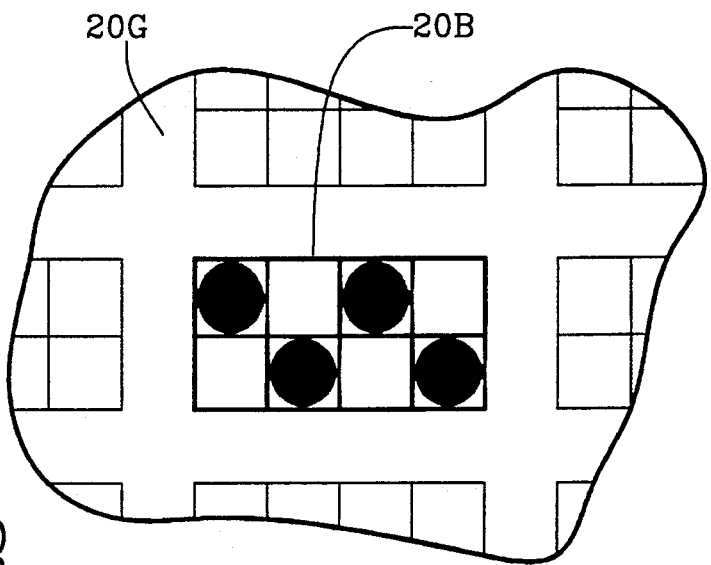
FIG. 2B is a fragmentary view of a 4 in 8 embodiment arranged in two rows each 4 columns wide.
Figure 2C:
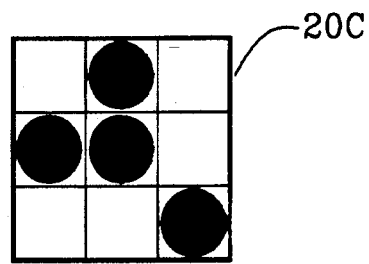
FIG. 2C is a fragmentary view of a 4 in 9 embodiment arranged in 3 rows each 3 columns wide.

CODE EMBODIMENTS (FIGS. 2A, 2B and 2C)

The number of codes represented by a particular E in L data format depends on the number of locations available and the number of entries permitted. The embodiment of FIG. 2A shows data unit 20A with E=4 entries in L=8 locations arranged in one row (R=1, C=8). The embodiment of FIG. 2B shows data unit 20B with two rows each having L/2=4 locations (R=2, C=4). The above 4 entries in 8 locations embodiments having 70 possible codes calculated as follows:

$$C=(L!) / (L-E)!(E!) (8!) / (8-4)!(4!)=70$$

The fractional term (L!)/(L−E)! yields the number of ways 4 entries of recording material may be entered into 8 locations. In the 4 of 8 embodiments the fractional term is 8×7×6×5=1,680. The denominator term (N!)=4×3×2×1=24 eliminates the redundant codes from the fractional term. The resulting 70 codes are order insensitive entry patterns, each forming a unique arrangement of entries and empty locations usable for storing digital data.

In general the number of codes contained in a data format system is maximum for the case E=L/2. The following Code Table A of the 4 in 8 embodiment (see FIGS. 2A and 2B) shows that the more codes are available when E=L/2=4.

CODE TABLE A
Entries E and Codes C
for L = 8, E = 0 through 8

| | | | | | | | | | |
|---|---|---|---|---|---|---|---|---|---|
| Number of Entries E | 0 | 1 | 2 | 3 | 4 | 5 | 6 | 7 | 8 |
| Number of Codes C | 1 | 8 | 28 | 56 | 70 | 56 | 28 | 8 | 1 |
| Remainders L-E | 8 | 7 | 6 | 5 | 4 | 3 | 2 | 1 | 0 |

The number of Codes C represent by the various E cases is symmetrical about the center peak value because of the equivalence between the entries E and the non-entry remainders L−E. As shown in the bottom line of Code Table A, each case for E is equivalent to the corresponding L−E L case. That is, E=3 in L=8 has 56 codes, and L-3=5 in L=8 also has 56 codes. As can clearly be seen from CODE TABLE A, the E=0 case and the E=L case provide only one code each and are therefore not useful. That is, E may be any whole integer greater than 0 but less then L, exclusive of 0 and L.

This equivalence symmetry is also true for odd values of L such as data unit 20C (see FIG. 2C) with 9 locations arranged in 3 rows and 3 columns, as shown in the following Code Table B.

CODE TABLE B
Entries E and Codes C
for L = 9, E = 0 through 9

| | | | | | | | | | | |
|---|---|---|---|---|---|---|---|---|---|---|
| No of Entries E | 0 | 1 | 2 | 3 | 4 | 5 | 6 | 7 | 8 | 9 |
| No of Codes C | 1 | 9 | 36 | 64 | 126 | 126 | 64 | 36 | 9 | 1 |
| Remainders L-E | 9 | 8 | 7 | 6 | 5 | 4 | 3 | 2 | 1 | 0 |

Figure 3:
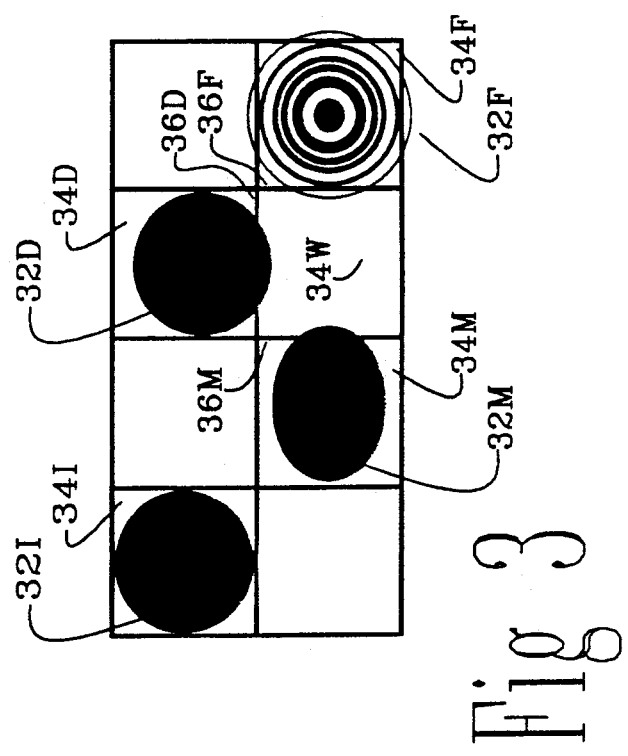
FIG. 3 is a diagram of a single data unit showing toner intrusion between adjacent locations.

The number of codes peak for the case E=(L-1)/2=4 and the parity case E=(L+1)/2=5. The E=4 embodiment (see FIG. 2A), consumes 20% less toner and offers four fewer intrusion interfaces (see FIG. 3).

More codes may be obtained by increasing the number of locations L in the data format as shown in Code Table C for L=16.

CODE TABLE C
Entries E and Codes C
for L = 16, E = 0 through 16

| Entries | 0 | 2 | 4 | 6 | 8 | 10 | 12 | 14 | 16 |
|---|---|---|---|---|---|---|---|---|---|
| Codes | 1 | 120 | 1820 | 8008 | 12870 | 8008 | 1820 | 120 | 1 |
| L-E | 16 | 14 | 12 | 10 | 8 | 6 | 4 | 2 | 0 |

Increasing the E in L data format from 4 in 8 (Code Table A) to 8 in 16 (Code Table C) doubled the base area required to carry the data, but increased the number of codes C available by a factor of 12870/70=183.8. However the larger number of codes requires larger processing memories and a longer processing time.

BASE MEDIUM 10

Base medium may 10 be any suitable sheet like structure with sufficient body to retain the recording material in position within the data format. The base medium may be a synthetic substance such as mylar (or other plastics) or the base medium may be a natural cellulose substance such as paper. Some plastic bases may be reused by washing off the recording material with a solvent.

RECORDING MATERIAL 12

Recording material 12 may be any suitable powder or liquid such as toner material which may be deposited on the recording medium, and which contrasts with the base medium. Both powder and liquid toner material may be deposited with sufficient accuracy by conventional laser printers and ink jet printers.

During scanning to retrieve the data, the dark toner absorbs most of the incident scanning photons resulting in a high greyscale value. The dark or black grey scale $GS_b$ of the "near black" toner approaches a theoretical greyscale limit 100% which is never obtained due to residual reflection of the toner. The exposed paper is light and reflects most of the photons resulting in a low greyscale value. The light or white $GS_w$ of the "near white" paper approaches theoretical limit of 0% which is never obtained due to residual adsorption of the paper. The surface roughness of the paper scatters some of the incident light adding to the value of $GS_w$.

The signal-to-noise ratio of the scanning system is defined by the relative greyscales of the near black and near white locations:

$$S/N=(\text{contrast signal}) / (\text{background noise})$$

$$S/N=(GS_b-GS_w) / \text{Maximum } [S.D.(GS_b), S.D.(GS_w)]$$

where
S.D.($GS_b$) is the standard deviation of the values of the $GS_b$ entries throughout the system, and
S.D.($GS_w$) is the standard deviation of the values of the $GS_w$ entries.

In a high data density embodiment, each toner entry may be a single dot formed by many smaller toner particles. Lower density embodiments, may have entries formed by a collection of dots such as 2×2 or 3×3. The $GS_b$ of the dot collection is an average of all of the dots in the collection, and will have small greyscale deviations then the single dot embodiment.

The toner may be a black carbon based material or a colored based material. A plurality of pigmented toners having colors such as red, yellow, and green may be employed in a single system. The color of each entry is as significant as the location of the entry within the data unit. The number of codes C that may be represented by a color based E in L data unit is determined by the relationship:

$$C = 2^P(L!) / (L-E)!(E!)$$

where
P is the number of pigments or colors employed.
A 3 color 4 in 8 data unit has $8 \times 70 = 560$ available codes. Toner color systems formed by primary colors present many color schemes for supporting a vast number of codes.

METHOD OF RETRIEVING

The method of reading digital data stored in an E in L type data unit involves scanning the data unit, ordering the scanned data by greyscale, and selecting the E locations with the highest greyscale as the E designated present locations. The scanning is accomplished by a suitable photon sensing arrangement such as a wide spectrum light source with an LED detector array. The resulting stream of L data signals is modulated in response to the amount of deposited recording material in each of the L locations. The modulation of the signals are compared to determine the order of the signals from most modulation to least modulation. The E most modulated signals are selected as the E entries. These signals correspond to the E locations with the most deposited recording material.

In a light/dark embodiment, the base medium is light (white paper) and generally reflective to the scanning photons, and the recording material is dark (black toner) and generally non-reflective to the scanning photons. The modulations provided during the scanning step are greyscale modulations produced by the difference in reflectivity of the locations. The E locations with the highest greyscale (toned locations) may be selected, or the $L-E$ locations with the lowest greyscale (non-toned) may be selected. The selection process is non-parametric. The value of the greyscales are not measured or compared to a threshold reference value, but merely ordered within the group of L signals.

TONER INTRUSION —(FIG. 3)

High data densities require small locations, and the toner from a toned location may intrude over a location interface into an adjacent location. If the adjacent location receiving the intruding toner is another toned location (black), the intrusion is harmless. However if the adjacent location is designated as a toner absent location (white), the presence of the intruding toner will darken the adjacent light location from a low greyscale value (near 100% white) to a higher greyscale value. Toner intrusion across this present/absent interface reduces the signal to noise ratio.

Ideal toner entry 32I (see FIG. 3) is a perfectly round dot formed of infinitely tiny toner particles, and centered in square location 34I with a well defined periphery. Toner entry 32I does not intrude on any of the adjacent locations, even though the entry fills the location touching the interface sides 36I of the location. Maximum theoretical dark grey scale $GS_b$max is 78.5%, and occurs when the diameter of the entry dot equals the side dimension of the square location. Each of the four white corners of the location occupy about 5.6% of the area of the location. The maximum greyscale condition produces potential zones of intrusion along the middle portion of the interfaces where the circle entry in tangent to the side of the location.

Misshapen toner entry 32M in location 34M, however is not ideal but is considerably out-of-round due to timing and optical imperfections. A portion of the misshapen entry intrudes across interface 36M into adjacent white location 34W. This intrusion both lowers the greyscale value for toned location 34M from the maximum value of 78.5%, and increases the grey scale for white location 34W from a near zero value. This unfortunate adjustment in grey scale decreases the signal to noise ratio of the digital data.

Displaced toner entry 32D in location 34D, is also not ideal. The displaced entry is below the center of the location due to registration imperfections. A portion of the displaced entry intrudes across interface 36D into adjacent white location 34W which further decreases the signal to noise.

Fuzzy toner entry 32F in location 34F, does not have a well defined periphery due to the statistical spread of parameters values in the printing process. Dispersion of the toner ink particles produces a larger dot with progressively decreasing toner concentration from center of the entry to the periphery. Toner particles from the fuzzy entry intrudes across interface 36F into adjacent white location 34W.

Intrusion from the adjacent black locations due to entry shape, placement and dispersion (and other causes such finite size toner particles) increases the light grey scale $GS_w$ of white location 34W. This degradation may result in white location 34W having a higher greyscale value then greyscale of one of the toned locations in the same data unit causing a read error. Guard band 20G (see FIG. 2B) around each data unit prevents toner intrusion from black locations in the adjacent data units.

The toner dots may be smaller than the square locations containing the dots in order to reduce the intrusion into the adjacent locations. FIG. 2A shows a toner dot with a diameter of about 0.7 the length of the side of the square location.

FIGURE OF RELIABILITY

Codes with many B/W (black to white) intrusion interfaces have a lower reliability than codes with fewer B/W interfaces. On the other hand like to like interfaces B/B (black to black) and W/W (white to white) offer no possibility of intrusion and tend to improve the reliability. The Figure of Reliability (FR) for codes in general is:

$$FR = (B/B + W/W) / (B/W)$$

where
B/B is the number of black to black interfaces in the code,
W/W is the number of white to white interfaces in the code, and
B/W is the number of black to white interfaces in the code.

The less reliable codes may be discarded to improve the overall reliability of the data format, or assigned to special functions.

In the guard band embodiment (see FIG. 2B) the 12 exterior interfaces (Ext) are protected from intrusion by toner from adjacent data units by guard band 20G. Only the 10 interior interfaces must be considered. For the guard band embodiment, the FR becomes:

$$FR = (B/B + W/W + EXT) / (B/W)$$

where
EXT is the number of external interfaces protected by a guard band.

The FRs for the 4 in 8 codes (with 2 rows and 4 columns) are shown in FIGS. 4A–4F and calculated in Table D below:

TABLE D

Figure 4A:
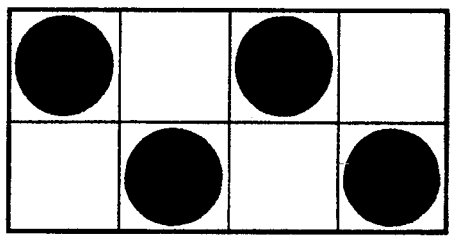
FIG. 4A-4F show a various codes represented by the 4 entries in 8 locations data format.
Figure 4B:
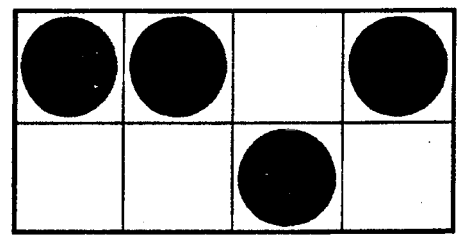
Figure 4C:
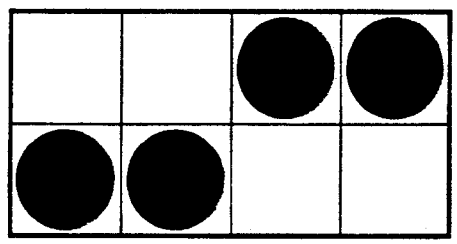
Figure 4D:
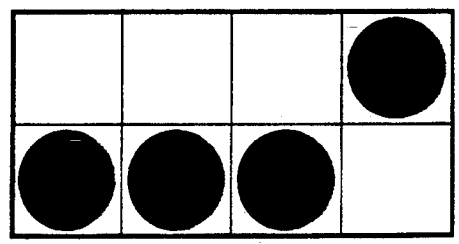
Figure 4E:
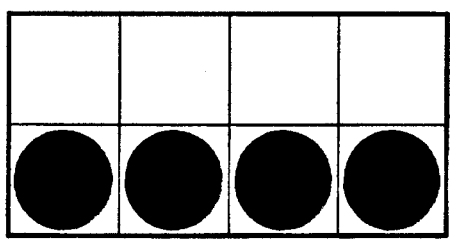
Figure 4F:
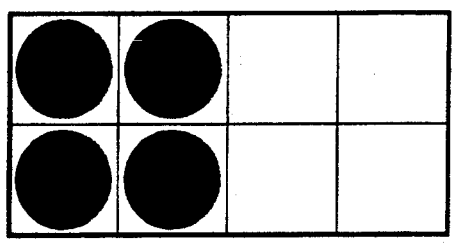

| Figure of Reliability With Guard Band (E = 4, L = 8, R = 2, C = 4) | |
| --- | --- |
| FIG. 4A | FR = (0 + 0 + 12)/10 = 6/5 = 1.20 |
| FIG. 4B | FR = (1 + 1 + 12)/8 = 7/4 = 1.75 |
| FIG. 4C | FR = (2 + 2 + 12)/6 = 8/3 = 2.66 |
| FIG. 4D | FR = (2 + 2 + 12)/6 = 8/3 = 2.66 |
| FIG. 4E | FR = (3 + 3 + 12)/4 = 9/2 = 4.50 |
| FIG. 4F | FR = (4 + 4 + 12)/2 = 10 = 10.00 |

The FRs vary from a low value of 1 (no B/B or W/W) to a high value of 9 (maximum B/B and W/W with minimum B/W).

In the same six codes without the guard band, the 12 exterior interfaces may be treated as one half L/L (like to like) either B/B or W/W, and one half B/Wext, based on a 50% black and 50% white distribution of entries in the adjacent data units. For the non-guard band embodiment, the FR becomes:

$$FR = (B/B + W/W + L/L) / (B/Wint + B/Wext)$$

where
L/L is the total number of black to black plus white to white interfaces around the exterior of the data unit,
B/Wint is the number of black to white interfaces inside the data unit, and
B/Next is the number of black to white interfaces around exterior of the data unit.

The FRs for the guard band embodiment are calculated in Table E below:

TABLE E

| Figure of Reliability Non Guard Band (E = 4, L = 8, R = 2, C = 4) | |
| --- | --- |
| FIG. 4A | FR = (0 + 0 + 6)/(10 + 6) = 3/8 = .375 |
| FIG. 4B | FR = (1 + 1 + 6)/(8 + 6) = 4/7 = .572 |
| FIG. 4C | FR = (2 + 2 + 6)/(6 + 6) = 5/6 = .833 |
| FIG. 4D | FR = (2 + 2 + 6)/(6 + 6) = 5/6 = .833 |
| FIG. 4E | FR = (3 + 3 + 6)/(4 + 6) = 6/5 = 1.200 |
| FIG. 4F | FR = (4 + 4 + 6)/(2 + 6) = 7/4 = 1.750 |

The FRs for the non guard band embodiment are much lower than the guard band embodiment due to the intrusion of toner from adjacent data units.

CODE/TEST EMBODIMENT (FIG. 5)

Figure 5:
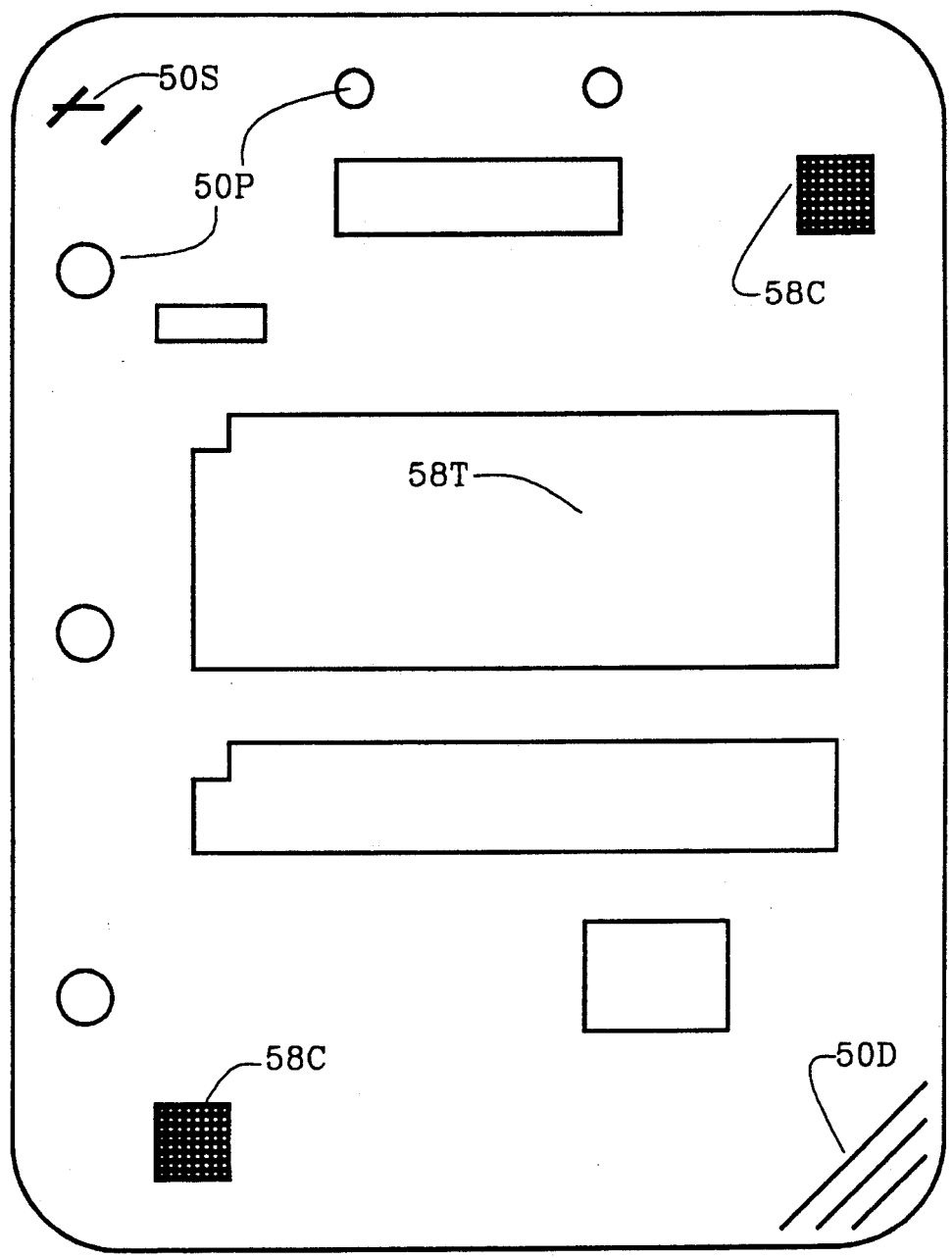
FIG. 5 is a diagram of a document containing printed text with the corresponding data codes printed in the corner.

The digital data contained in the codes may be any type of information including control software, identification matter, and alpha-numeric codes such as ASCII. Document 50 containing eye readable printed text 58T (see FIG. 5) occupying a major portion of the document, may have the corresponding ASCII codes 58C printed on the same document occupying a minor portion thereof. The storage site for the code may be positioned in the margin out of the normal text area. The text/code embodiment of FIG. 5 shows code sites in the lower lefthand corner and in the upper righthand corner of the document away from punch holes 50P, staples 50S, and dog eared wear 50D in the lower righthand corner. These corner positions permit the code site to be scanned for code retrieval without removing the document from the binder or book holding a set of documents together.

Eight bit ASCII code has 256 possible codes which could be converted into an E in L data format having an equal (or greater) number of codes. Alternatively, the most reliable 64 codes of the 70 codes provided by the 4 in 8 data format may be employed to represent each six byte segment of the 8 bit ASCII code data stream. The 2,000 maximum character capacity of a conventional 8 ½ by 11 inch sheet has 16,000 conventional binary bytes requiring 2,666 of the 4 in 8 data units. At a dot density of 300 dpi, only a fragment of a square inch is required to hold the 2,000 ASCII codes. The numbers and dimensions given above are not intended as defining the limitations of the invention. Numerous other applications and configurations are possible.

INDUSTRIAL APPLICABILITY

It will be apparent to those skilled in the art that the objects of this invention have been achieved by providing an E in L data unit in which the E locations having highest greyscale are selected as the entry locations.

CONCLUSION

Clearly various changes may be made in the structure and embodiments shown herein without departing from the concept of the invention. Further, features of the embodiments shown in the various Figures may be employed with the embodiments of the other Figures.

Therefore, the scope of the invention is to be determined by the terminology of the following claims and the legal equivalents thereof.

I claim as my invention:

1. A two dimensional row and column based system for storing digital data, comprising:
base medium having at least one digital data storage area formatted along a row axis and a column axis;
deposited recording material carried by the base medium for recording the digital data by the selective presence and absence of the recording material within the storage area;
a plurality of two dimensional data units within the storage area, each data unit having L data locations with R locations extending along the row axis and C locations extending along the column axis, any E locations of which are designated recording material present locations and L−E locations of which are designated recording material absent locations, E being any whole integer greater than 0 but less than L exclusive of 0 and L;
each location designated as recording material present location which is positioned adjacent to a location designated as recording material absent location having a present-absent interface therebetween; and
the number of possible codes C represented by a data unit is determined by the relationship $$C = (L!) / (L-E)!(E!) - (\text{discarded codes}),$$

in which the discarded codes have the most present-absent interfaces between adjacent locations.

2. The system of claim 1, further comprising interunit guard margins between adjacent data units.

3. The system of claim 2, wherein the inter-unit guard margins are designated as recording material absent areas.

4. The system of claim 3, wherein the inter-unit guard margins extend along the row axis between adjacent data units.

5. The system of claim 3, wherein the inter-unit guard margins extend along the row axis and along the column axis between adjacent data units.

6. The system of claim 1, wherein the base medium is paper and the recording material is a generally non-reflective toner substance deposited as a single round dot of toner in each of the designated toner substance present locations on the paper medium and wherein the locations for receiving the round toner dots are square.

7. The system of claim 6, wherein the paper medium also contains alpha-numeric text in readable form.

8. The system of claim 7, wherein the alpha-numeric text in readable form is also contained in digital form in the digital data codes in the data units within the storage area.

9. The system of claim 8, wherein alpha-numeric text occupies the major portion of the paper medium and the digital data storage area occupies a minor portion of the paper medium.

10. The system of claim 8, wherein the digital data storage area is located in the upper righthand corner of the paper medium.

11. The system of claim 8, wherein the digital data storage area is located in the lower lefthand corner of the paper medium.

12. The system of claim 6, wherein each designated present location contains a single toner dot.

13. The system of claim 6, wherein the diameter of the round toner dot is shorter in length to the side of the square location.

14. The system of claim 6, wherein the diameter of the round toner dot is about 0.7 of the length of the side of the square location.

* * * * *